(12) United States Patent
Choi et al.

(10) Patent No.: US 7,035,455 B2
(45) Date of Patent: Apr. 25, 2006

(54) COLOR TEMPERATURE CONVERSION APPARATUS FOR VARIABLY CHANGING COLOR TEMPERATURE OF INPUT IMAGE AND METHOD THEREOF

(75) Inventors: Hyung-Jin Choi, Suwon (KR); Bong-Soon Kang, Busan (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 562 days.

(21) Appl. No.: 10/208,795

(22) Filed: Aug. 1, 2002

(65) Prior Publication Data
US 2003/0063799 A1    Apr. 3, 2003

(30) Foreign Application Priority Data
Aug. 24, 2001   (KR) .............................. 2001-51268

(51) Int. Cl.
*G06K 9/00* (2006.01)
(52) U.S. Cl. ........................ 382/162; 382/167
(58) Field of Classification Search ............... 382/162, 382/167, 274; 345/589, 591, 600; 348/655, 348/630
See application file for complete search history.

(56) References Cited

U.S. PATENT DOCUMENTS 6,560,358 B1 *   5/2003   Tsukada ..................... 382/167
6,594,384 B1 *   7/2003   Kim et al. .................. 382/162

* cited by examiner

*Primary Examiner*—Phuoc Tran
(74) *Attorney, Agent, or Firm*—Sughrue Mion, PLLC (57) ABSTRACT

A color temperature conversion apparatus capable of varying and outputting a color temperature of an input image, and a method thereof. The color temperature conversion apparatus has a color temperature detect unit that detects an input color temperature of an input image, a color temperature determine unit that calculates an output color temperature from the input color temperature based on a target color temperature, a coefficient calculate unit that calculates a color temperature conversion coefficient to convert the input color temperature into the output color temperature, and a color temperature conversion unit that converts the input color temperature into the output color temperature.

27 Claims, 6 Drawing Sheets

COLOR TEMPERATURE CONVERSION APPARATUS FOR VARIABLY CHANGING COLOR TEMPERATURE OF INPUT IMAGE AND METHOD THEREOF

BACKGROUND OF THE INVENTION

1. Field of the Invention

The present invention relates to a color temperature conversion apparatus and method thereof, and more particularly, to a color temperature conversion apparatus and method thereof capable of variably calculating an output color temperature from an input color temperature of an input image. The present application is based on Korean Patent Application No. 2001-51268, filed Aug. 24, 2001.

2. Description of the Related Art

When a person views an object, the person generally perceives that color tone varies based on illumination characteristics. In other words, while one may perceive that the color tone of an object under an incandescent lamp is generally reddish, the color tone is comparatively bluish in daylight. Therefore, in a color display system, there is a need to change the color of an object input into the system, to a color that a person sees. The color tone that is generally shown relates to a color temperature. The term color temperature refers to the temperature at which a black body will emit a light of the same When a person views an object, the person generally perceives that color tone varies based on illumination characteristics. In other words, while one may perceive that the color tone of an object under an incandescent lamp is generally reddish, the color tone is comparatively bluish in daylight. Therefore, in a color display system, there is a need to change the color of an object input into the system, to a color that a person sees. The color tone that is generally shown relates to a color temperature. The term color temperature refers to the temperature at which a black body will emit a light of the same color as that of a given source, and is measured in Kelvin [K] units. If the color temperature is high, then the color tone is bluish. If the color temperature is low, then the color tone is reddish.

A color display system is broadly used for apparatuses that need to transmit visual information to a user. The apparatuses include, for example, a TV, a DTV (digital TV), a PDP (Plasma Display Panel), a TFT (Thin Film Transistor) monitor, a color printer, a digital camera, a projector, a mobile phone, and so on. The color temperature should be adjusted to improve the quality of a picture in the color display system.

Color models include a RGB (red, green, blue) model, a Hue, Saturation, Brightness/Hue, Lightness, Saturation (HSB/HLS) model, a Munsell color system, and a Commission Internationale de l'Eclairage, or CIE, color model. The CIE color model is set by The International Commission on Illumination, which defines lighting standards. The CIE color model includes color models CIEXYZ, CIELUV, and CIELAB. The CIEXYZ color model expresses RGB values as a set, X, Y, Z, of different values, all having positive signs. Generally, the X, Y, Z values are referred to as tri-stimulus.

A conventional method of converting the color temperature uses the CIEXYZ color model, and more particularly, it is a color temperature conversion method using both the X-axis and Y-axis.

Figure 1:
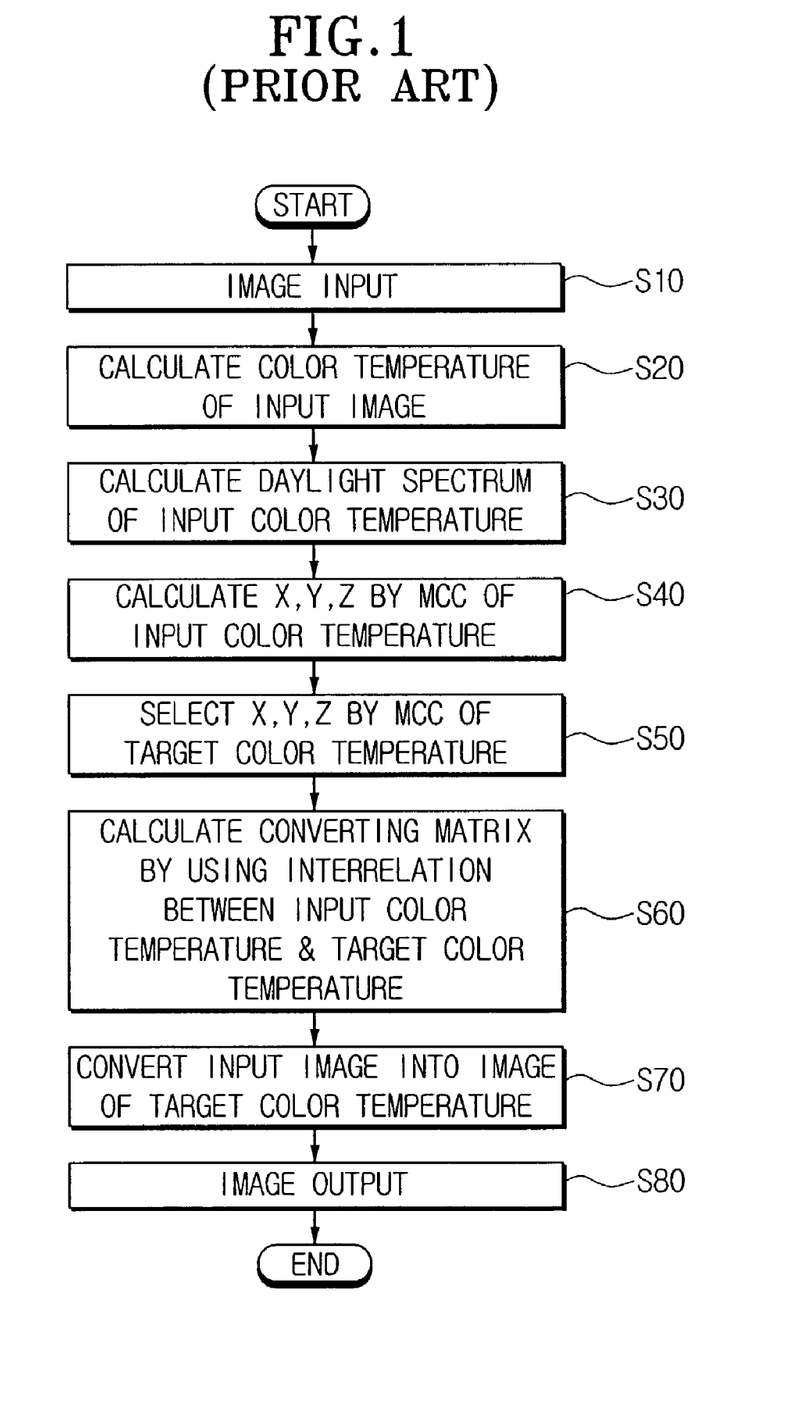
FIG. 1 is a flowchart showing a conventional color temperature conversion method.

FIG. 1 is a flowchart showing the conventional color temperature conversion method.

A detailed procedure of the conventional color temperature conversion method has been described in "Color Science: concepts and methods, quantitative data and formulas", 2$^{nd}$ edition, pp. 145–146 & pp. 225–228, 1982, by Gunter Wyszecki and W. S. Stiles. According to the conventional color temperature conversion method, when an image is input (S10), the color temperature Tc of the input image is calculated (S20). Then, a daylight spectrum related to the color temperature Tc of the calculated input image is calculated (S30). The daylight spectrum is calculated by following equations 1) and 2) in accordance with a range of the color temperature Tc of the input image.

1) When the color temperature of the input image is within a range of 4000 K$\leq$Tc<7000 K, the daylight spectrum $X_D$ is calculated by, $$X_D = -4.067\frac{10^9}{T_C^3} + 2.9678\frac{10^6}{T_C^2} + 0.09911\frac{10^3}{T_C} + 0.244063 \quad \text{[Equation 1]}$$

2) When the color temperature of the input image is within a range of 7000 K$\leq$Tc<25000 K the daylight spectrum $X_D$, $Y_D$ is calculated by, $$X_D = -2.0064\frac{10^9}{T_C^3} + 1.9018\frac{10^6}{T_C^2} + 0.24748\frac{10^3}{T_C} + 0.237040 \quad \text{[Equation 2]}$$

$$Y_D = -3X_D^2 + 2.87X_D - 0.275$$

A spectrum radiant power distribution $S_D(\lambda)$ of the daylight is calculated by, $$S_D(\lambda) = S_0(\lambda) + M_1 S_1(\lambda) + M_2 S_2(\lambda) \quad \text{[Equation 3]}$$

where, $[S_0(\lambda), S_1(\lambda), S_2(\lambda)]$ correspond to [sO[31], s1[31], s2[31]], and sO[31], s1[31], s2[31] are fixed values, while $$M1 = \frac{-1.3515 - 1.7703x_D + 5.9114y_D}{0.0241 + 0.2562x_D - 0.7341y_D}$$

$$M2 = \frac{0.0300 - 31.4424x_D + 30.0717y_D}{0.0241 + 0.2562x_D - 0.7341y_D}$$

X, Y, Z of a Macbeth color checker (MCC) is calculated (S40). The MCC obtains the X, Y, Z of each path from the following mathematical equation 4. At this time, the applied MCC has thirty-one (31) elements when a wavelength ($\lambda$) has a range of 400 nm to 700 nm. The interval of each element is 10 nm.

$$\begin{bmatrix} X_i^{ME} \\ Y_i^{ME} \\ Z_i^{ME} \end{bmatrix}_{3X1} = \begin{bmatrix} \bar{x}[i] \\ \bar{y}[i] \\ \bar{z}[i] \end{bmatrix}_{3X31} [R[i]]_{31X31} [E[i]]_{31X1} \quad \text{[Equation 4]}$$

where, i=1, 2, . . . , 31, and $$\begin{bmatrix} \bar{x}[i] \\ \bar{y}[i] \\ \bar{z}[i] \end{bmatrix}_{3X31}$$

is the function value of color matching, and

[R[i]]$_{31\times31}$ is a reflectance diagonal matrix related to one color path, and each wavelength band value exists only in the diagonal term of the matrix. Off-diagonal terms are all zero, and

[E[i]]$_{31\times1}$ is a spectrum power dispersion of the illumination.

$X_i^{ME}$, $Y_i^{ME}$, and $Z_i^{ME}$ are MCC tri-stimulus values related to the color temperature Tc of the input image.

The X, Y, Z of the MCC of target color temperature is selected (S50).

A converting matrix is calculated (S60) according to the following mathematical equation 5, using correlation of the color temperature Tc of the input image and the target color temperature.

$$[TM]_{3\times3} = [(XYZ)^{MT}]^{-1}{}_{3\times24}[(XYZ)^{ME}]_{3\times24} \quad [\text{Equation 5}]$$

where, [TM]$_{3\times3}$ is a converting matrix, and

[(XYZ)$^{MT}$]$^{-1}{}_{3\times24}$ is a matrix of MCC tri-stimulus values X, Y, Z related to the target color temperature, and

[(XYZ)$^{ME}$]$_{3\times24}$ is a matrix of MCC tri-stimulus values X, Y, Z related to the color temperature Tc of the input image.

The input image is converted to an image of the target color temperature (S70). In other words, it is converted to an image of a target illumination by using the calculated converting matrix.

$$\begin{bmatrix} X_t \\ Y_t \\ Z_t \end{bmatrix} = [TM] \begin{bmatrix} X \\ Y \\ Z \end{bmatrix} \quad [\text{Equation 6}]$$

where, $X_t$, $Y_t$ and $Z_t$ are the tri-stimulus elements according to the target color temperature, and

[TM] is the converting matrix, and

X, Y and Z are the tri-stimulus elements according to the color temperature Tc of the input image.

As described above, the image that is converted to the target color temperature is output (S80) to various color display apparatuses.

In the conventional color temperature conversion method, as described above, the tri-stimulus values X, Y, Z of the MCC related to the color temperature Tc of the input image and the tri-stimulus values X, Y, Z related to the target color temperature, should be calculated to draw out the color temperature converting matrix. The number of matrices needed to realize the conventional color temperature conversion method in hardware is shown in table one.

TABLE 1

| Type of Matrix | Number Needed |
|---|---|
| 31 × 1 | 3 |
| 24 × 31 | 1 |
| 3 × 31 | 1 |
| 24 × 3 | 1 |

Also, a matrix inversion part is needed to obtain the converting matrix. In addition, a plurality of multipliers and dividers are needed for calculating the above equations. Therefore, applying the conventional color temperature Tc conversion method in hardware generates a problem of low practicality and utility in terms of size and costs.

Meanwhile, when displaying one screen, since the conventional color temperature converting apparatus converts one frame of the input image into a predetermined fixed target color temperature, a fine adjustment of color temperature to one frame cannot be guaranteed.

SUMMARY OF THE INVENTION

The present invention has been made to overcome the above-mentioned shortcomings of the related art. Accordingly, it is an object of the present invention to provide a color temperature conversion apparatus capable of converting an input color temperature into another color temperature.

Another object of the present invention is to provide a color temperature conversion apparatus, which is easily achieved at a hardware level.

Yet another object of the present invention is to provide a color temperature conversion apparatus capable of converting various input color temperatures into other color temperatures according to output color temperatures that are calculated in proportion to the input images.

According to the present invention, by calculating color temperature that is variably converted from an input color temperature of an input image, the optimal image quality can be obtained.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE PREFERRED EMBODIMENTS

The preferred embodiment of the present invention will now be described with reference to the drawings.

Figure 2:
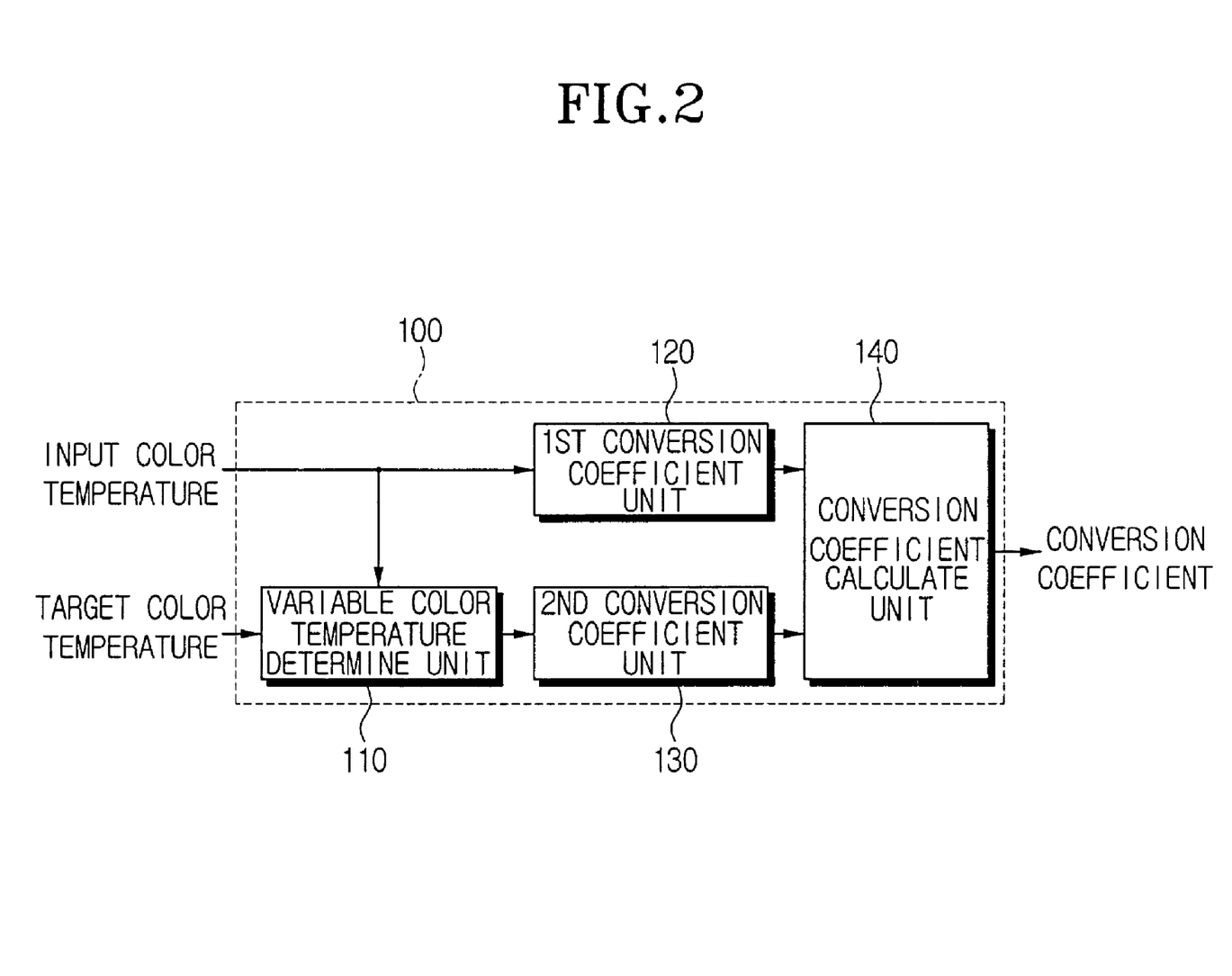
FIG. 2 is a block diagram showing a color temperature conversion apparatus for obtaining a color temperature conversion coefficient according to the present invention.

FIG. 2 is a block diagram showing the color temperature conversion apparatus for obtaining a color temperature conversion coefficient according to the present invention.

As shown in FIG. 2, the color temperature conversion apparatus has a first conversion coefficient unit 120, a second conversion coefficient unit 130, a conversion coefficient calculate unit 140 and a variable determine unit 110.

The first conversion coefficient unit 120 calculates a first coefficient C1 to convert the input color temperature Ti into a certain temperature Tp. The second conversion coefficient unit 130 calculates a second coefficient C2 to convert the certain color temperature Tp into an output color temperature To. The conversion coefficient calculate unit 140 calculates a third coefficient C3 to convert the input color temperature Ti into the output color temperature To, by using the first coefficient C1 and the second coefficient C2. Meanwhile, the variable determine unit 110 variably selects the output color temperature To from the input color temperature Ti and the target color temperatures of the input color temperature Ti, and outputs the selected output color temperature To.

Preferably, the target color temperature includes an offset value A2, which is a variable of the input color temperature Ti, and an address value A1 of the database (not shown) storing target temperatures of the input color temperature conversion. According to the target color temperature inputted to the variable determine unit 110, the input color temperature Ti is converted into the output color temperature To, and outputted to the second conversion coefficient unit 130.

Figure 3:
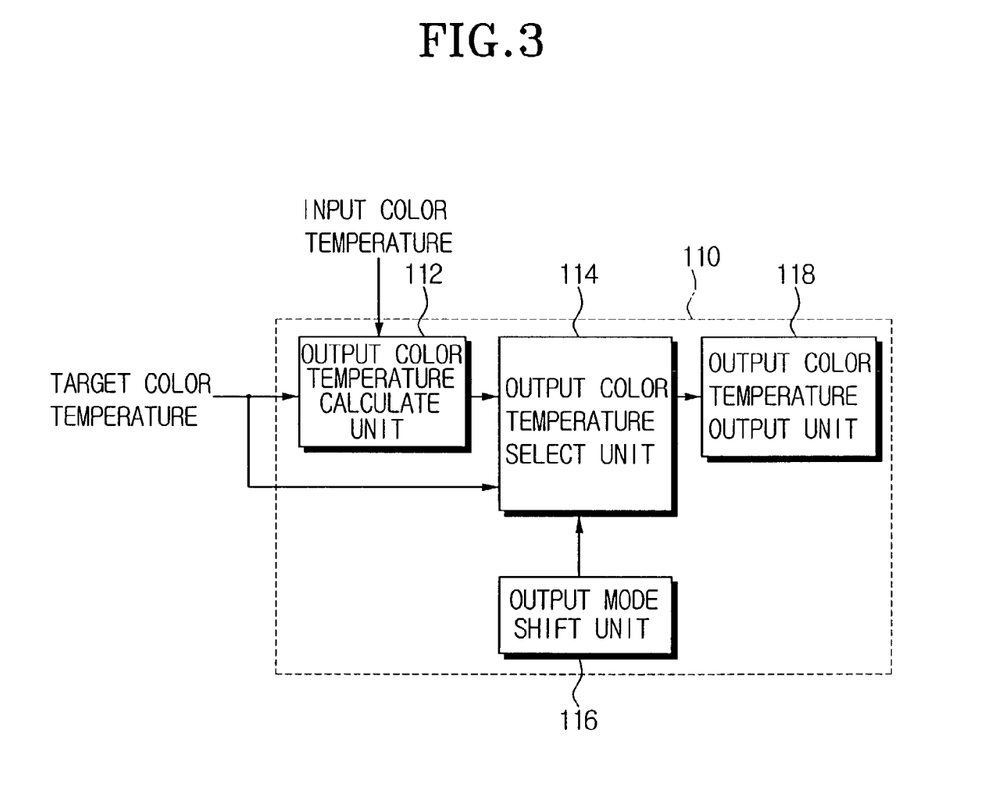
FIG. 3 is a block diagram showing the variable determination unit of FIG. 2 in detail.

FIG. 3 is a block diagram showing the variable determine unit 110 in greater detail. The variable determine unit 110 has an output color temperature calculate unit 112, an output color temperature select unit 114, an output color temperature output unit 118 and an output mode shift unit 116. The output color temperature calculate unit 112 calculates a first target color temperature by summing the input color temperature Ti and the offset value A2 of the target color temperature. The output color temperature select unit 114 calculates a second target color temperature corresponding to the address value A1 of the target temperature, and selects one from the first target color temperature and the second target color temperature to output according to the selection command signal. The output color temperature output unit 118 outputs the target color temperature selected at the output color temperature select unit 114 to the second conversion coefficient unit 130. The output mode shift unit 116 controls the output color temperature select unit 114 which selects one from the first and the second target color temperatures to output. In the output mode shift unit 116, it is preferable to select the first target color temperature when the mode is such that the color temperature, which is variable in proportion to the color temperature of the input image by adding the offset value to the inputted color temperature, is selected to be output. It is preferable to select the second target color temperature when the mode is such that the target temperature is outputted by converting the input color temperature into a predetermined fixed target color temperature.

Figure 4:
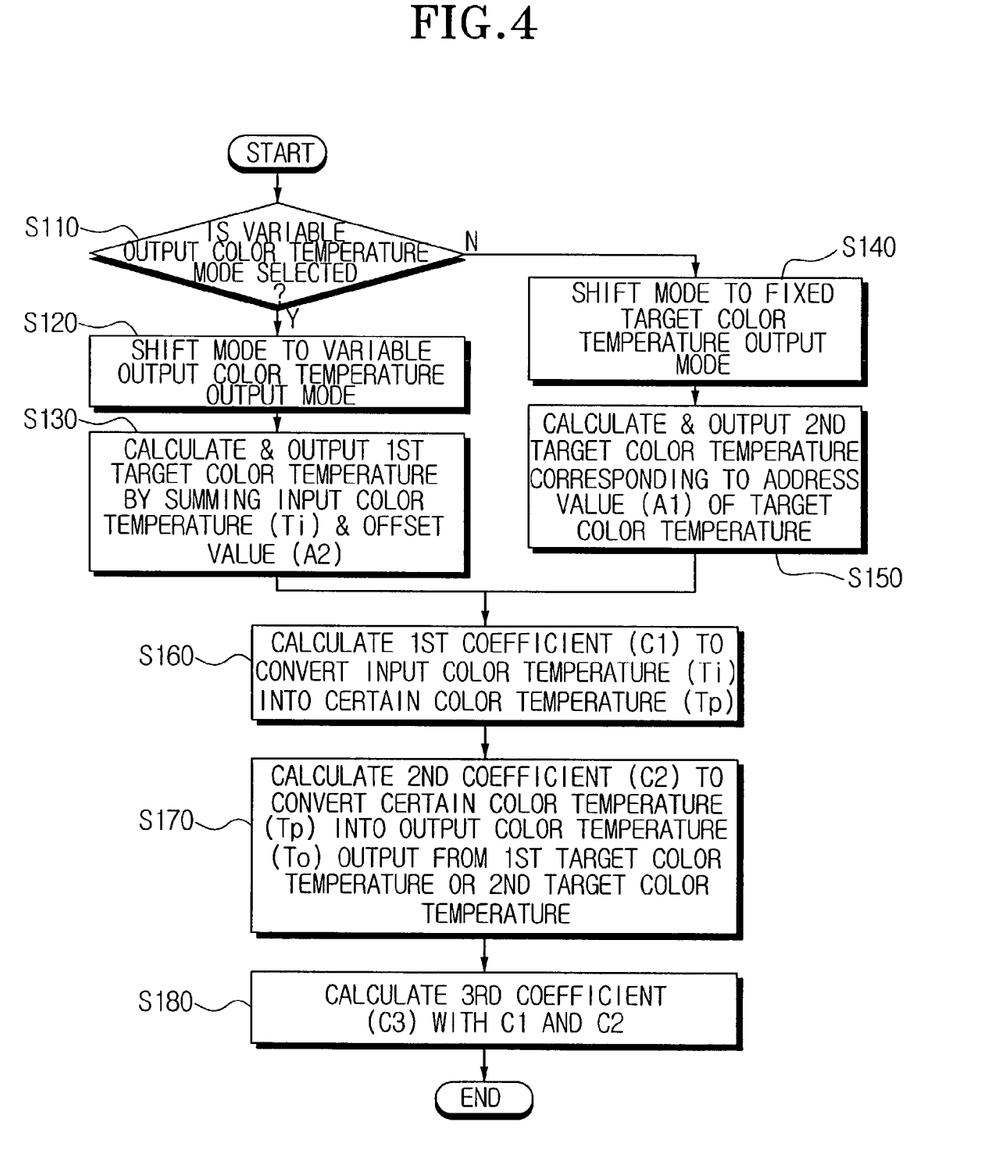
FIG. 4 is a flowchart showing a method for obtaining the color temperature conversion coefficient according to the present invention.

FIG. 4 is a flowchart showing a method for obtaining the color temperature conversion coefficient according to the present invention.

First, the variable determine unit 110 determines whether the output color, which is variable in proportion to the input color temperature, should be selected, or the output color temperature should be fixed to a certain target color temperature, according to the information of the selection made by a user (step S110). If the selection information indicates that the output color temperature should be in proportion to the input color temperature, the output mode shift unit 116 shifts the mode to the variable output color temperature mode, controlling the output color select unit 114 to select the first target color temperature outputted from the output color temperature calculate unit 112 as a corresponding target color temperature (step S120). At this time, the output color temperature calculate unit 112 calculates the first target color temperature by adding the offset value A2 of the target color temperature to the input color temperature Ti (step S130). The output color temperature output unit 118 outputs the first target color temperature calculated in S130 to the second conversion coefficient unit 130 according to the mode shifted in S120.

If the mode is selected in S110 for the fixed target color temperature, the output mode shift unit 116 shifts to the fixed target color temperature output mode and controls the output color temperature select unit 114 (step S140). The output color temperature select unit 114 calculates the second target color temperature that corresponds to the address value A1 of the target color temperature (step S150). The output color temperature select unit 114 also outputs the calculated second target color temperature to the second conversion coefficient unit 130 according to the mode shifted in S140.

Meanwhile, the first conversion coefficient unit 120 calculates the first coefficient C1 to convert the input color temperature Ti into a certain color temperature Tp (step S160). Further, the second conversion coefficient unit 130 calculates the second coefficient C2 to convert the certain color temperature Tp into the output color temperature To, which is selected from the first target color temperature and the second target color temperature (step S170). The conversion coefficient calculate unit 140 calculates the third coefficient C3 to convert the input color temperature Ti into the output color temperature To, with the calculated first and the second coefficients C1 and C2 (step S180).

Figure 5:
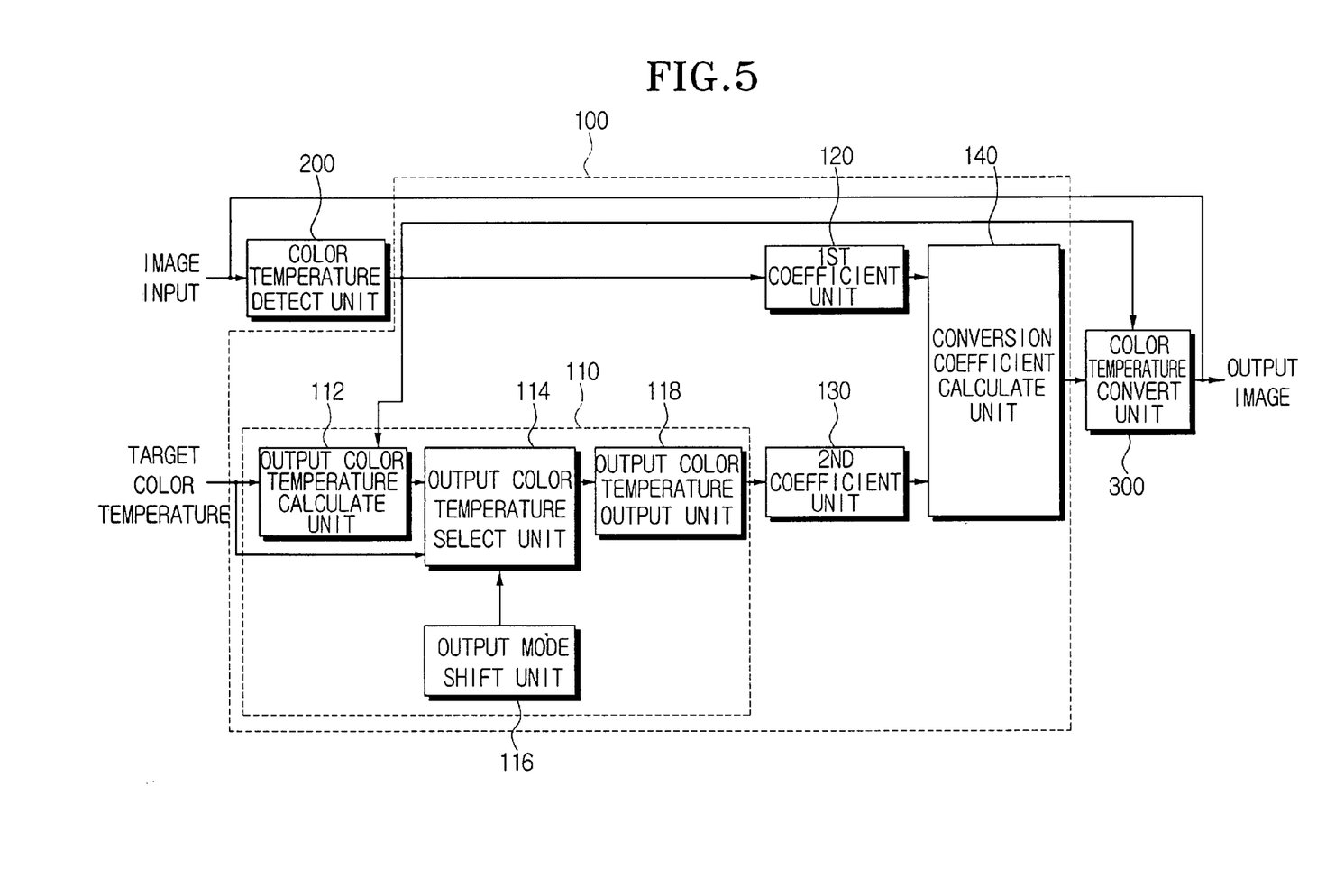
FIG. 5 is a block diagram showing the color temperature calculation apparatus using the conversion coefficient calculating apparatus according to the present invention.

FIG. 5 is a block diagram showing the color temperature calculating apparatus of the image display system according to the present invention. While describing FIG. 5, description of the like elements that are similar to those of FIGS. 2 and 3 will be omitted.

Referring to FIG. 5, the color temperature calculating apparatus includes a color temperature detect unit 200, a color temperature conversion coefficient calculate unit 100, and a color temperature convert unit 300. The color temperature detect unit 200 detects the input color temperature Ti from the input image. The color temperature conversion coefficient calculate unit 100 includes a variable determine unit 110 and conversion coefficient calculate units 120, 130, 140. The variable determine unit 110 variably selects the output color temperature To from the input color temperature Ti and the target color temperature of the input color temperature Ti, and outputs the output color temperature To. The conversion coefficient calculate units 120, 130, 140 calculate the input color temperature Ti and a certain conversion coefficient to convert the input color temperature Ti into the output color temperature To. The color temperature convert unit 300 converts the input color temperature Ti into the output color temperature To with the color temperature conversion coefficients calculated by the conversion coefficient calculate units 120, 130, 140.

Accordingly, an input image, whose input color temperature is adaptively converted, is obtained. After the conversion, the image can be displayed on the image display apparatus. Further, if the image is a motion picture, the color temperature is calculated through the offset value according to the target color temperature so that the input image can be converted into an optimal color temperature. Accordingly, color temperature can be adaptively varied with respect to the motion picture.

Figure 6:
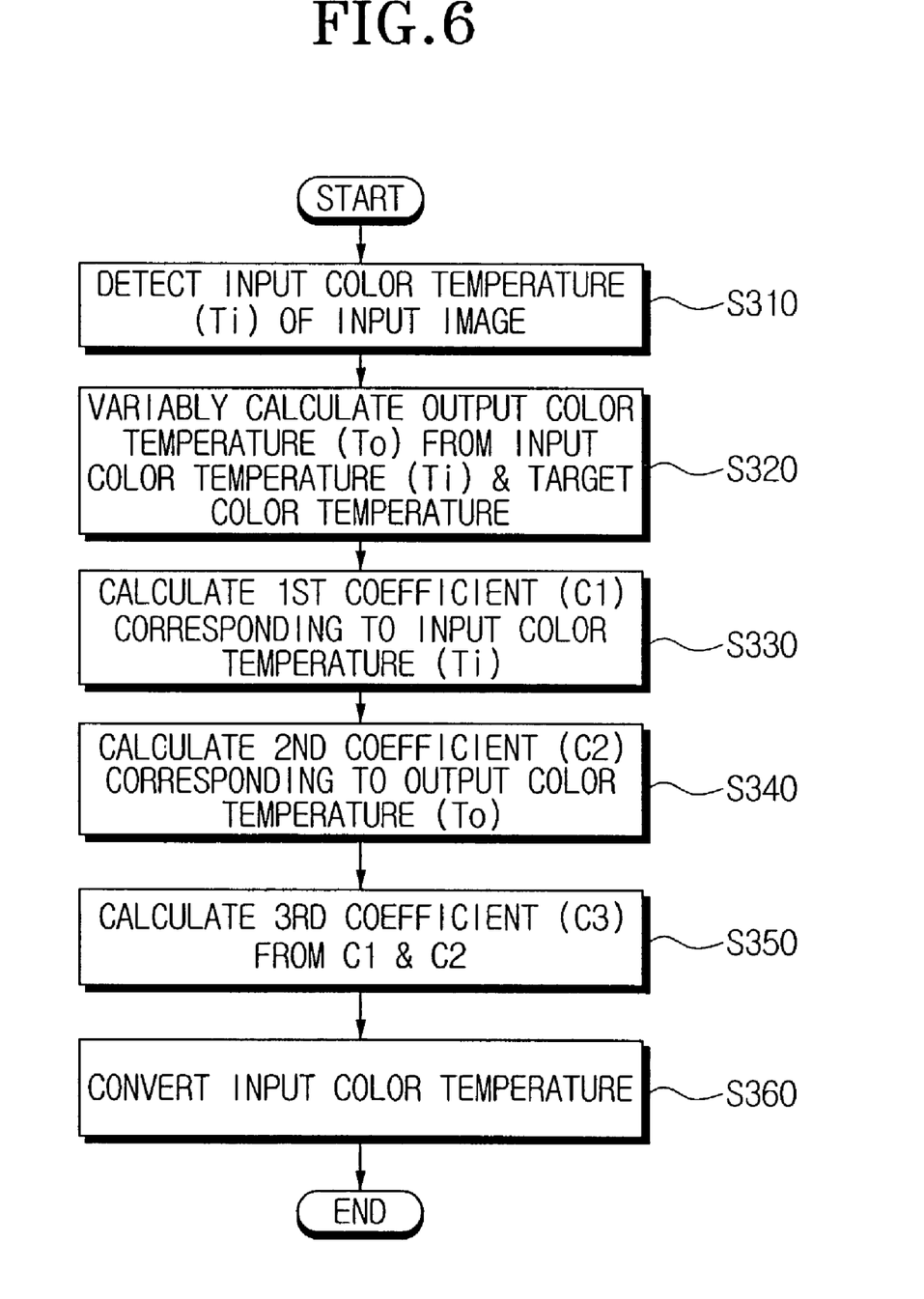
FIG. 6 is a flowchart showing the color temperature conversion method using the color temperature conversion apparatus according to the present invention.

FIG. 6 is a flowchart showing the color temperature conversion method using the color temperature conversion apparatus according to the present invention.

Referring to FIG. 6, first, the input color temperature Ti of the input image is detected (step S310). Next, the variable determine unit 110 calculates a variable output color temperature To from the input color temperature Ti and the target color temperature (step S320). The first conversion coefficient unit 120 calculates the first coefficient C1 to convert the input color temperature Ti into a certain color temperature Tp (step S330). The second conversion coefficient unit 130 calculates the second coefficient C2 to convert the certain color temperature Tp into the output color temperature output from either the first target color temperature or the second target color temperature (step S340). The conversion coefficient calculate unit 140 calculates the third coefficient C3 to convert the input color temperature Ti into the output color temperature To, by multiplying the calculated first and second coefficients C1 and C2 (step S350). The color temperature convert unit 300 converts the input color temperature Ti into the output color temperature To, by multiplying the calculated third coefficient C3 obtained in S350 by the input image (step S360). As the input color temperature Ti is converted into the output color temperature To, the input image becomes an output image of the color temperature conversion apparatus according to the present invention. The converted output image is displayed through a display unit (not shown).

The color temperature conversion apparatus and method thereof according to the preferred embodiment of the present invention can be applied to a general image display system and method thereof.

According to the present invention, the color temperature, which is adaptively converted from the input color temperature of the input image, is output. As a result, an optimal image quality of the input image is guaranteed. Also, according to the present invention, the input color temperature of the inputted image is variably converted into a color temperature that is most suitable for a motion picture, by calculating a color temperature coefficient through an offset value according to a target color temperature. Accordingly, the complexity of the hardware is reduced, resulting in a more practical, useful and expandable application.

While the invention has been shown and described with reference to the preferred embodiments thereof, it will be understood by those skilled in the art that various changes in form and details may be made therein without departing from the sprit and scope of the invention as defined by the appended claims.

What is claimed is:

1. An apparatus for calculating a coefficient of color temperature conversion, comprising:
   a first coefficient unit for calculating a first conversion coefficient to convert an input color temperature of an input image into a particular color temperature;
   a color temperature determine unit for receiving a target color temperature for the input color temperature, and calculating an output color temperature for an output of the input color temperature based on the target color temperature;
   a second coefficient unit for calculating a second conversion coefficient to convert the particular color temperature into the output color temperature; and
   a coefficient calculate unit for calculating a third conversion coefficient to convert the input color temperature into the output color temperature based on the first and the second conversion coefficients.

2. The apparatus for calculating a coefficient of color temperature conversion of claim 1, wherein the target color temperature includes,
   an address value stored in a database and corresponding to the target color temperature for conversion of the input color temperature, and
   an offset value for the conversion of the input color temperature.

3. The apparatus for calculating a coefficient of color temperature conversion of claim 2, wherein the color temperature determine unit comprises:
   an output calculate unit for calculating a first target color temperature by adding the offset value to the input color temperature; and
   an output selecting unit for calculating a second target color temperature corresponding to the address value, and selecting one from the first target color temperature and the second target color temperature.

4. The apparatus for calculating a coefficient of color temperature conversion of claim 3, wherein the color temperature determine unit comprises a color temperature output unit for outputting the first target color temperature or the second target color temperature that is selected at the output selecting unit.

5. The apparatus for calculating a coefficient for color temperature conversion of claim 3, wherein the color temperature determine unit comprises a mode shift unit for controlling a selection operation of the output select unit according to a mode selected by a user.

6. The apparatus for calculating a coefficient for color temperature conversion of claim 5, wherein the mode shift unit controls the output select unit to select the first target color temperature when a selection is made by the user to output an output color temperature variable in proportion to the input color temperature, and
   controls the output select unit to select the second target color temperature when a selection is made by the user to output the target color temperature.

7. A color temperature conversion apparatus, comprising:
   a color temperature detect unit for detecting an input color temperature of an input image;
   a color temperature determine unit for receiving a target color temperature for the input color temperature, and calculating an output color temperature to output the input color temperature based on the target color temperature;
   a coefficient calculate unit for calculating a color temperature conversion coefficient to convert the input color temperature into the output color temperature; and
   a color temperature convert unit for converting the input color temperature into the output color temperature based on the color temperature conversion coefficient.

8. The color temperature conversion apparatus of claim 7, wherein the target temperature includes,
   an address value stored in a database and corresponding to the target color temperature for conversion of the input color temperature, and
   an offset value for the conversion of the input color temperature.

9. The color temperature conversion apparatus of claim 8, wherein the color temperature determine unit comprises:
   an output calculate unit for calculating a first target color temperature by adding the offset value to the input color temperature; and
   an output select unit for calculating a second target color temperature corresponding to the address value, and selecting the first target color temperature or the second target color temperature.

10. The color temperature conversion apparatus of claim 9, wherein the color temperature determine unit comprises a color temperature output unit for outputting the first target color temperature or the second target color temperature that is selected by the output selecting unit.

11. The color temperature conversion apparatus of claim 10, wherein the color temperature determine unit comprises a mode shift unit for controlling a selection operation of the output select unit according to a mode selected by a user.

12. The color temperature conversion apparatus of claim 10, wherein the mode shift unit controls the output select unit to select the first target color temperature when a selection is made by the user to output an output color temperature variable in proportion to the input color temperature, and, controls the output select unit to select the second target color temperature when a selection is made by the user to output the target color temperature.

13. The color temperature conversion apparatus of claim 12, wherein the coefficient calculate unit comprises:

a first coefficient unit for calculating a first conversion coefficient to convert the input color temperature into a particular color temperature;

a second coefficient unit for calculating a second conversion coefficient to convert the particular color temperature into the output color temperature; and a conversion coefficient calculate unit for calculating a color temperature conversion coefficient to convert the input color temperature into the output color temperature based on the first conversion coefficient and the second conversion coefficient.

14. A color temperature conversion method, comprising the steps of:

detecting an input color temperature of an input image;

calculating an output color temperature to output the input color temperature based on the input color temperature and a target color temperature of the input color temperature;

calculating a color temperature conversion coefficient to convert the input color temperature into the output color temperature; and converting the input color temperature into the output color temperature based on the color temperature conversion coefficient.

15. The color temperature conversion method of claim 14, wherein the target color temperature includes:

an address value stored in a database and corresponding to the target color temperature for conversion of the input color temperature, and at least one variable offset value for the conversion of the input color temperature.

16. The color temperature conversion method of claim 15, wherein the output color temperature calculating step comprises the steps of:

calculating a first target color temperature by adding one of the at least one variable offset value to the input color temperature;

calculating a second target color temperature corresponding to the address value, and selecting either the first target color temperature or the second target color temperature; and outputting a selected one of the first target color temperature and the second target color temperature as the target color temperature.

17. The color temperature conversion method of claim 16, prior to the selecting step, further comprising a step of setting an output mode of selecting and outputting one of the first target color temperature and the second target color temperature.

18. The color temperature conversion method of claim 17, wherein, in the mode setting step, the first target color temperature is selected when a selection is made by a user to output the output color temperature variable in proportion to the input color temperature, and the second target color temperature is selected when a selection is made by the user to output the target color temperature.

19. The color temperature conversion method of claim 14, wherein the color temperature conversion coefficient calculating step comprises the steps of:

calculating a first conversion coefficient to convert the input color temperature into a particular color temperature;

calculating a second conversion coefficient to convert the particular color temperature into the output color temperature; and calculating the color temperature conversion coefficient to convert the input color temperature into the output color temperature based on the first conversion coefficient and the second conversion coefficient.

20. An image display system, comprising:

a color temperature detect unit for detecting an input color temperature of an input image;

a color temperature determine unit for variably calculating an output color temperature based on the input color temperature and a target color temperature of the input color temperature after conversion;

a coefficient calculate unit for calculating a color temperature conversion coefficient to convert the input color temperature into the output color temperature;

a color temperature convert unit for converting the input color temperature into the output color temperature based on the color temperature conversion coefficient; and a display unit for displaying the image of converted color temperature.

21. The image display system of claim 20, wherein the target color temperature includes:

an address value stored in a database and corresponding to the target color temperature for conversion of the input color temperature, and at least one variable offset value for the conversion of the input color temperature.

22. The image display system of claim 21, wherein the color temperature determine unit comprises:

a calculate unit for calculating a first target color temperature by adding one of the at least one offset value to the input color temperature;

a select unit for calculating a second target color temperature corresponding to the address value, and selecting one from the first target color temperature and the second target color temperature as the target color temperature;

an output unit for outputting one of the first target color temperature and the second color temperature selected by the select unit; and a mode shift unit for controlling a selection operation of the select unit according to the mode selected by a user.

23. The image display system of claim 22, wherein the mode shift unit controls the output select unit to select the first target color temperature when a selection is made by a user to output an output color temperature variable in proportion to the input color temperature, and controls the output select unit to select the second target color temperature when a selection is made by the user to output the target color temperature.

24. An image display method, comprising the steps of:

detecting an input color temperature of an input image;

calculating an output color temperature to output the input color temperature based on the input color temperature and a target color temperature after conversion of the input color temperature;

calculating a coefficient of color temperature conversion to convert the input color temperature into the output color temperature;

converting the input color temperature into the output color temperature based on the color temperature conversion coefficient; and displaying the image of the converted output color temperature.

25. The image display method of claim 24, wherein the target color temperature includes:

an address value stored in a database and corresponding to the target color temperature for conversion of the input color temperature, and a variable offset value for the conversion of the input color temperature.

26. The image display method of claim 25, wherein the output color temperature calculating step comprises the steps of:

calculating a first target color temperature by adding the offset value to the input color temperature;

shifting an output mode of selecting one from the first target color temperature and a second target color temperature corresponding to the address value;

selecting one from the first target color temperature and the second target color temperature as the target color temperature according to the output mode; and outputting one of the first target color temperature and the second target color temperature as the target color temperature.

27. The image display method of claim 26, wherein the output mode selects the first target color temperature when a selection is made by a user to output color temperature variable in proportion to the input color temperature, and the output mode selects the second target color temperature when a selection is made by the user to output the target color temperature.

* * * * *